Patented Nov. 25, 1930

1,782,842

UNITED STATES PATENT OFFICE

CECIL JOHN TURRELL CRONSHAW AND WILLIAM JOHNSON SMITH NAUNTON, OF BLACKLEY, MANCHESTER, ENGLAND, ASSIGNORS TO BRITISH DYESTUFFS CORPORATION LIMITED, OF MANCHESTER, ENGLAND

USE OF THE MONO- AND DI-CARBALKOXY-DIARYLTHIOUREAS AS ACCELERATORS IN THE VULCANIZATION OF RUBBER

No Drawing. Application filed October 27, 1926, Serial No. 144,643, and in Great Britain March 1, 1926.

We have discovered that the symmetrical thioureas having the structure,

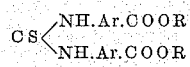

in which R represents an alkyl group and Ar represents a divalent aromatic residue, and in which the carbalkoxy group in each nucleus is ortho to the NH group, are valuable accelerators of the vulcanization of rubber. In view of the acidic nature of the carboxy groups in these bodies, it was contrary to expectation that they should be very much more active than other classes of substituted ureas. For example, a simple rubber (caoutchouc) mix containing 100 parts smoked sheet, 10 parts zinc oxide and 10 parts of sulphur and 1.63 parts of di-ortho-carbethoxydiphenyl-thiourea, having the structure

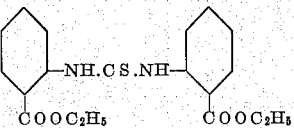

after vulcanization in the press for two and a half minutes at 141° C. possesses a tensile strength of 3,600 pounds per square inch. If in place of the above-named compound an equivalent amount of diphenylthiourea (thiocarbanilide) is used, the resulting vulcanizate shows a tensile strength considerably below one-half of this value.

Other similarly constituted di-carbalkoxyaryl thioureas in which each carbalkoxy group is ortho to an NH group are also suitable accelerators and show similar marked advantages over the simple uncarboxylated diarylthioureas. Such carbalkoxy derivatives may be made, for example, by the method described by Dyson and George in the Journal of the London Chemical Society, 1924, vol. 125, p. 1708, i. e. by the action of thiophosgene upon alkyl anthranilates. The crude reaction mixture may be used, but we prefer to employ the products isolated as described by Dyson and George, in order to obtain the active principle (the stated thioureas). During vulcanization the accelerator, with the other contents of the mix, is exposed to moderately high temperatures. According to some modern views, it is not the accelerator as applied which is effective, but the accelerator as changed or decomposed by the heat used in vulcanization which is responsible for the effects produced. It will accordingly be understood that, in referring to the di o-carbalkoxyaryl thioureas themselves as accelerators, we mean to include also the products formed when these are subjected to a moderately high temperature.

What we claim and desire to secure by Letters Patent is:—

1. The method of vulcanizing rubber which comprises admixing rubber with vulcanizing agents and an ortho carbalkoxyaryl thiourea having the formula

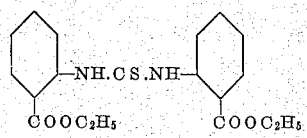

and subjecting the mixture to vulcanizing influences.

2. A vulcanized composition containing reaction products of rubber, vulcanizing agents and an ortho carbalkoxyaryl thiourea having the formula.

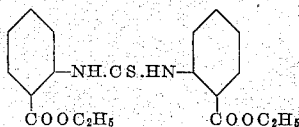

In witness whereof, we affix our signatures.

CECIL JOHN TURRELL CRONSHAW.
WILLIAM JOHNSON SMITH NAUNTON.